(12) United States Patent
Seibel et al.

(10) Patent No.: US 12,379,761 B2
(45) Date of Patent: Aug. 5, 2025

(54) MANAGEMENT OF ENERGY EFFICIENCY PARAMETERS FOR RESOURCES IN EDGE COMPUTING SYSTEM

(71) Applicant: Dell Products L.P., Round Rock, TX (US)

(72) Inventors: Amy N. Seibel, Newton, MA (US); Michael Robillard, Shrewsbury, MA (US)

(73) Assignee: Dell Products L.P., Round Rock, TX (US)

( * ) Notice: Subject to any disclaimer, the term of this patent is extended or adjusted under 35 U.S.C. 154(b) by 312 days.

(21) Appl. No.: 17/682,820

(22) Filed: Feb. 28, 2022

(65) Prior Publication Data

US 2023/0273663 A1 Aug. 31, 2023

(51) Int. Cl.
*G06F 1/3203* (2019.01)
*H04L 43/08* (2022.01)

(52) U.S. Cl.
CPC ............ *G06F 1/3203* (2013.01); *H04L 43/08* (2013.01)

(58) Field of Classification Search
CPC ............................... G06F 1/3203; H04L 43/08
See application file for complete search history.

(56) References Cited

U.S. PATENT DOCUMENTS

| | | | | |
|---|---|---|---|---|
| 10,372,691 B1 * | 8/2019 | Reiner | ................ | G06F 16/838 |
| 2015/0302440 A1 * | 10/2015 | Monden | ............ | G06Q 30/0206 |
| | | | | 705/7.35 |
| 2016/0140359 A1 * | 5/2016 | Mukherjee | .............. | H04L 67/10 |
| | | | | 726/26 |
| 2020/0348875 A1 * | 11/2020 | Krasner | ................ | G06F 3/0659 |
| 2021/0037025 A1 * | 2/2021 | Schlarman | .......... | H04L 63/1408 |
| 2021/0125129 A1 * | 4/2021 | Vega | ................ | G06Q 10/06315 |
| 2021/0125253 A1 * | 4/2021 | Vega | ....................... | H04L 67/12 |
| 2023/0104246 A1 * | 4/2023 | Jeyapaul | .................. | G06N 3/08 |
| | | | | 713/320 |

OTHER PUBLICATIONS

The Kubernetes Authors, "Workloads," https://kubernetes.io/docs/concepts/workloads/, Accessed Jan. 20, 2022, 2 pages.

(Continued)

*Primary Examiner* — Lisa M Caputo
*Assistant Examiner* — Nyla Gavia
(74) *Attorney, Agent, or Firm* — Ryan, Mason & Lewis, LLP

(57) ABSTRACT

Techniques are disclosed for management of edge resources. For example, a method comprises receiving energy consumption data corresponding to operation of a plurality of edge devices from a plurality of edge service providers. In the method, a plurality of energy efficiency scores are computed based, at least in part, on the energy consumption data. The energy efficiency scores correspond to operation of one or more of the edge devices associated with respective ones of the edge service providers. The method further comprises receiving one or more energy consumption parameters from at least one user device for the operation of the one or more edge devices, and identifying based, at least in part, on the energy efficiency scores, a subset of the edge devices corresponding to the energy consumption parameters. Data corresponding to the subset of the edge devices is transmitted to the at least one user device.

20 Claims, 7 Drawing Sheets

(56) References Cited

OTHER PUBLICATIONS

S. J. Bigelow, "What is Edge Computing? Everything you Need to Know," https://www.techtarget.com/searchdatacenter/definition/edge-computing, Accessed Jan. 19, 2022, 11 pages.

U.S. Appl. No. 17/451,782, filed Oct. 21, 2021, and entitled "Use of IO Event Metadata to Enable XaaS Billing and Analytics."

U.S. Appl. No. 17/682,077 filed in the name of Amy N. Seibel et al. on Feb. 28, 2022, and entitled "Edge Utility System with Dynamic Aggregation of Edge Resources Across Multiple Edge Computing Sites."

U.S. Appl. No. 17/682,323 filed in the name of Amy N. Seibel et al. on Feb. 28, 2022, and entitled "Edge Utility System with Distributed Ledger Verification for Dynamic Aggregation of Edge Resources."

\* cited by examiner

MANAGEMENT OF ENERGY EFFICIENCY PARAMETERS FOR RESOURCES IN EDGE COMPUTING SYSTEM

FIELD

The field relates generally to information processing systems and, more particularly, to managing energy efficiency in such information processing systems.

BACKGROUND

An edge computing architecture moves at least a portion of data processing to the periphery of a network to be closer to a data source rather than to a centralized location, e.g., data center. For example, instead of transmitting raw data to a data center to be processed and analyzed, such tasks or workloads are performed at or near locations where the data is actually generated. In this manner, for example, network parameters such as bandwidth can be increased, while network parameters such as latency and congestion can be reduced, thus improving overall network reliability.

When attempting to acquire edge resources, i.e., devices that are configured to operate in an edge computing system (edge devices), there is a lack of data and control regarding the energy efficiency and environmental impact of edge service providers and their devices.

SUMMARY

Illustrative embodiments provide techniques for the management of energy efficiency parameters for edge resources such as edge devices.

For example, in one embodiment, a method comprises receiving energy consumption data corresponding to operation of a plurality of edge devices from a plurality of edge service providers. In the method, a plurality of energy efficiency scores are computed based, at least in part, on the energy consumption data. The plurality of energy efficiency scores correspond to operation of one or more edge devices of the plurality of edge devices associated with respective ones of the plurality of edge service providers. The method further comprises receiving one or more energy consumption parameters from at least one user device for the operation of the one or more edge devices, and identifying based, at least in part, on the plurality of energy efficiency scores, a subset of the plurality of edge devices corresponding to the one or more energy consumption parameters. Data corresponding to the subset of the plurality of edge devices is transmitted to the at least one user device.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, illustrative embodiments provide techniques for defining and configuring energy efficiency and environmental impact parameters (e.g., settings and/or requirements) in connection with edge devices. As an additional advantage, illustrative embodiments enable automatic generation of energy efficiency and environmental impact ratings.

These and other features and advantages of embodiments described herein will become more apparent from the accompanying drawings and the following detailed description.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising edge computing, cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
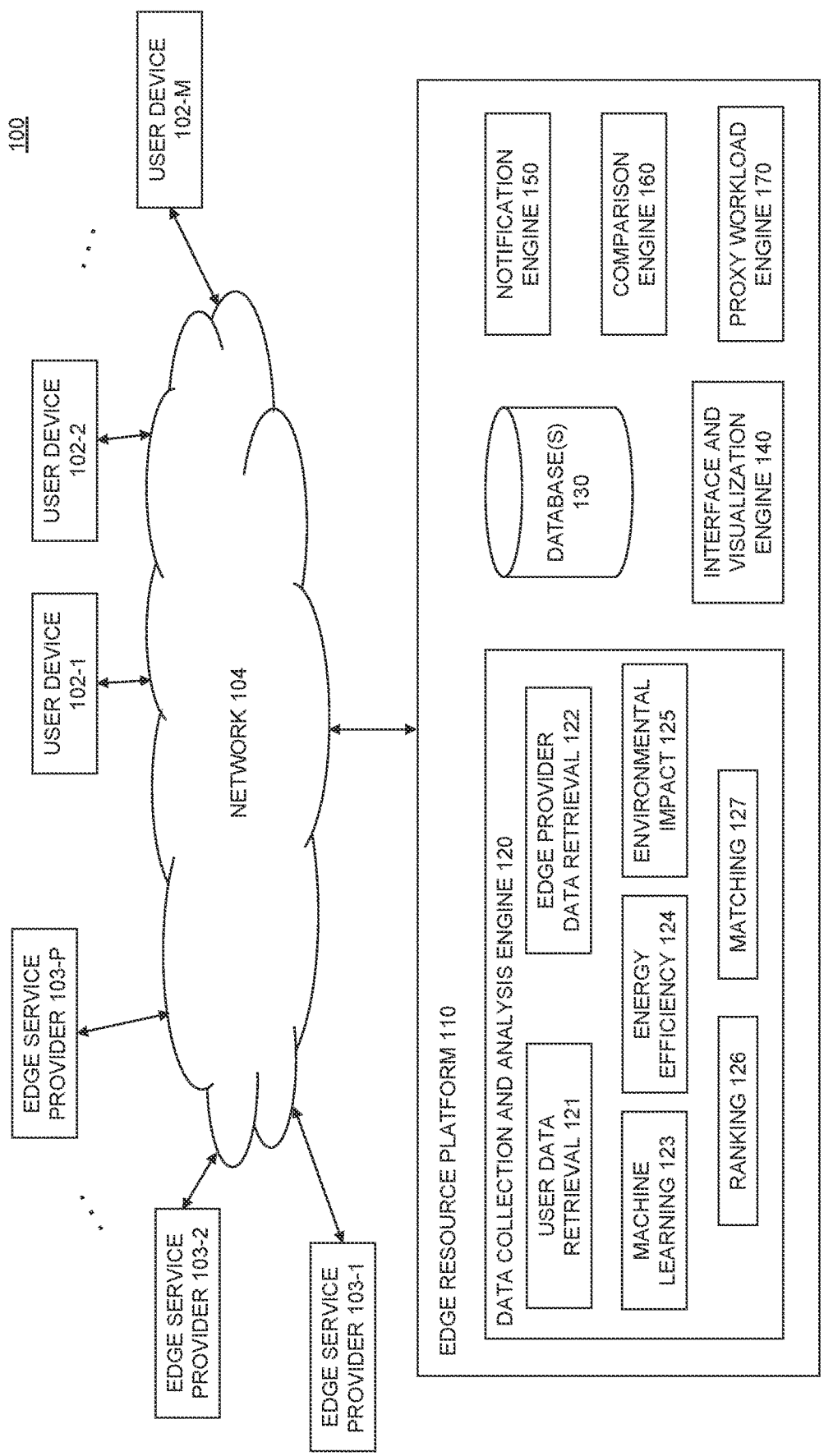
FIG. 1 is a block diagram of an information processing system configured for managing energy efficiency settings and requirements for edge resources in an illustrative embodiment.
Figure 2:
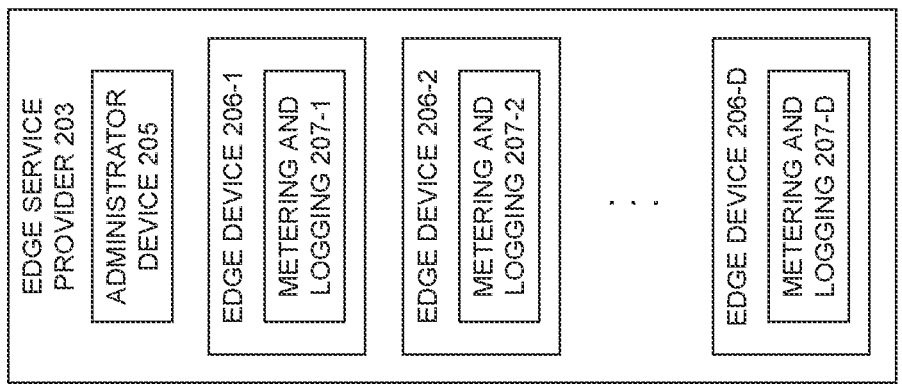
FIG. 2 shows an edge service provider including edge devices with metering and logging capability in an illustrative embodiment.

FIG. 1 shows an information processing system 100 configured in accordance with an illustrative embodiment for managing energy efficiency parameters (e.g., settings and/or requirements) for edge resource transactions. The information processing system 100 comprises a plurality of user devices 102-1, 102-2, . . . 102-M (collectively, user devices 102), and a plurality of edge service providers 103-1, 103-2, . . . 103-P (collectively, edge service providers 103) which communicate over network 104 with an edge resource platform 110. Referring to FIG. 2, an example edge service provider 203, which is configured similarly to or the same as the edge service providers 103, comprises an administrator device 205 and a plurality of edge devices 206-1, 206-2, . . . 206-D (collectively, edge devices 206), with each of the edge devices 206 comprising an instance of metering and logging logic 207-1, 207-2, . . . 207-D (collectively, metering and logging logic 207).

The user devices 102, administrator device 205 and edge devices 206 can comprise, for example, Internet of Things (IoT) devices, desktop, laptop or tablet computers, mobile telephones, servers, storage devices or other types of processing devices capable of processing tasks and/or communicating with each other over the network 104. Such devices are examples of what are more generally referred to herein as "processing devices." Some of these processing devices are also generally referred to herein as "computers." The user devices 102, administrator device 205 and edge devices 206 may also or alternately comprise virtualized computing resources, such as virtual machines (VMs), containers, etc. The user devices 102, administrator device 205 and edge devices 206 in some embodiments comprise respective computers associated with a particular company, organization or other enterprise. The variables D, M and P and other similar index variables herein such as K and L are assumed to be arbitrary positive integers greater than or equal to one.

The terms "client," "customer," "administrator" or "user" herein are intended to be broadly construed so as to encompass numerous arrangements of human, hardware, software or firmware entities, as well as combinations of such entities. Compute and/or storage services (e.g., at least a portion of the available services and functionalities provided by the edge resource platform 110) may be provided for users under a Platform-as-a-Service (PaaS) model, an Infrastructure-as-a-Service (IaaS) model, a Function-as-a-Service (FaaS) model, a Containers-as-a-Service (CaaS) model and/or a Storage-as-a-Service (STaaS) model, including cloud-based PaaS, IaaS, FaaS, CaaS and STaaS environments, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

Although not explicitly shown in FIG. 1, one or more input-output devices such as keyboards, displays or other types of input-output devices may be used to support one or more user interfaces to the user devices 102, administrator device 205 and edge devices 206, as well as to support communication between the user devices 102, administrator device 205, edge devices 206, the edge resource platform 110 and/or other related systems and devices not explicitly shown.

Users may refer to customers, buyers, sellers, providers, clients and/or administrators of computing environments for which management of energy efficiency settings and requirements for edge resource transactions is being performed. For example, in some embodiments, the user devices 102 and administrator devices 205 are assumed to be associated with repair technicians, system administrators, information technology (IT) managers, software developers release management personnel or other authorized personnel configured to access and utilize the edge resource platform 110.

The network 104 may be implemented using multiple networks of different types. For example, the network 104 may comprise a portion of a global computer network such as the Internet, although other types of networks can be part of the network 104 including a wide area network (WAN), a local area network (LAN), a satellite network, a telephone or cable network, a cellular network, a wireless network such as a WiFi or WiMAX network, a storage area network (SAN), or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

As used herein, the term "workloads" is to be broadly construed to refer to, for example, logical entities such as, for example, tasks, jobs, programs, applications, etc. Workloads comprise, for example, data and applications running as single components or several components working together, with the edge devices 206 providing computational resources to allow workloads to complete tasks. The size of a workload may be dependent on the amount of data and applications included in a given workload. Certain edge devices 206 may be better suited for certain types of workloads, depending on the characteristics of the workloads.

The edge resource platform 110 comprises a data collection and analysis engine 120, one or more databases 130, an interface and visualization engine 140, a notification engine 150, a comparison engine 160 and a proxy workload engine 170. The data collection and analysis engine 120 comprises a user data retrieval component 121, an edge service provider data retrieval component 122, a machine learning component 123, an energy efficiency component 124, an environmental impact component 125, a ranking component 126 and a matching component 127.

The edge resource platform 110 provides an infrastructure for edge service providers 103 to sell, provide or otherwise transfer (e.g., without cost) edge device resources and services to consumers. The edge resource platform 110 facilitates transactions (e.g., buying and selling) of available edge computing resources and services from a dynamic pool of edge service providers 103 situated at various edge locations.

A technical problem exists in that users have difficulty gaining insight into the energy efficiency and environmental impact of edge device operations from different edge service providers. Technical solutions illustratively described herein provide a platform which enables buyers and sellers of edge resources to define and configure energy efficiency and environmental impact settings and requirements in connection with transactions for edge device resources. For example, referring to FIGS. 1 and 2, the user data retrieval component 121 of the data collection and analysis engine 120 receives energy consumption requirements for edge device operation from one or more users via, for example, the user devices 102, and the edge provider data retrieval component 122 of the data collection and analysis engine 120 receives energy consumption data corresponding to operation of a plurality of edge devices 206 from a plurality of edge service providers 103/203. Based, at least in part, on the energy consumption data, the energy efficiency component 124 computes a plurality of energy efficiency scores corresponding to the operation of one or more edge devices 206 associated with respective ones of the edge service providers 103/203. The environmental impact component 125 computes a plurality of environmental impact ratings corresponding to the operation of the one or more edge devices 206 associated with the respective ones of edge service providers 103/203. In a non-limiting example, the plurality of environmental impact ratings are based, at least in part, on electricity usage of the one or more edge devices 206 associated with respective ones of the edge service providers 103/203 measured in pounds per megawatt hour (MWh) of carbon dioxide ($CO_2$), sulfur dioxide ($SO_2$) and nitrogen oxide ($NO_X$). It is to be understood that the environmental impact ratings are not limited to noted metrics, and may be based on other types of measurements.

Based, at least in part, on the energy efficiency scores and/or the environmental impact ratings, the matching component 127 identifies a subset of the plurality of edge devices 206 from the edge service providers 103/203, which correspond to one or more of the energy consumption requirements received by the user data retrieval component 121.

Referring to the metering and logging logic 207 in FIG. 2, at least some of the energy consumption data comprises metered data from respective ones of the plurality of edge devices 206 collected on, for example, a per workload basis, per application basis, per edge device basis or other basis at a different level of granularity, by the corresponding instances of the metering and logging logic 207. Per application and/or per-device metering facilitates determinations of amounts of power consumption associated with a particular edge service provider 103/203.

In an illustrative embodiment, the metering and logging logic 207 is a component of an edge device 206, which is configured to communicate with and transmit data to the edge resource platform 110. Alternatively, the metering and logging logic 207 can be part of another edge device, other computing device or a cloud service capable of retrieving data from one or more edge devices and transmitting the retrieved data to the edge resource platform 110. In one or more embodiments, the metering and logging logic 207 captures input-output (IO) event metadata, and other metadata pertaining to energy efficiency such as, but not necessarily limited to, power consumption levels.

The metering and logging logic 207 can be configured to capture, store and transmit metadata related to specific characteristics. For example, in illustrative embodiments, the metadata relates to energy efficiency and/or environmental impact. In some embodiments, in order to preserve integrity of the data, there may be limitations regarding who can access the data. For example, the data retrieved by the metering and logging logic 207 can be sent to the edge resource platform 110, and accessed by potential buyers (e.g., users via user devices 102), but may not be accessible to owners of the edge devices 206. In one or more embodiments, as the metering and logging logic 207 runs, it periodically broadcasts updated data to the edge resource platform 110.

The captured metadata corresponds to a plurality of software threads being executed on the plurality of edge devices 206 including, for example, a number of the software threads corresponding to each application and/or edge device 206 and corresponding power consumption data for respective ones of the plurality of software threads. In one or more embodiments, an edge device 206 determines an owner of each thread (e.g., financially responsible party for the thread) or whether a thread corresponds to overhead, as well as a duration of the thread.

Such information, which may be used as a basis for billing for edge services, is also applicable to determine energy efficiency in terms of cost and/or environmental impact. For example, there can be a cost associated with power consumption based on the length of time threads run and/or the number of threads being executed. Depending on the implementation, the cost can be adjusted based on time of day or other factors. For example, if electricity costs more at a certain time of day, subject to a buyer's pre-configured preferences, edge devices 206 are configured to schedule jobs (e.g., workloads) for times when there is less strain on the grid, less power consumption cost and/or less environmental impact.

In the case of overhead that is associated with running an edge device 206, the metering and logging logic 207 divides the overhead cost among the various device users based on, for example, the users' proportional percentages of use of the edge device 206. Use of the edge device 206 may include, for example, memory usage and IO usage. The energy efficiency component 124 and/or the environmental impact component 125 defines energy efficiency and/or environmental impact in terms of proportional uses and corresponding power consumption.

In some implementations, a monetary rate per thread and/or for overhead, which can vary based on variables such as, for example, time of day, can be set. When the metering and logging logic 207 logs thread usage for billing purposes, the rates can also be logged, associated with the threads and tied to energy efficiency and/or environmental impact.

The energy consumption data retrieved by the edge provider data retrieval component 122 from the edge service providers 103/203 also comprises data corresponding to a composition of electricity consumed by the edge devices 206. As can be understood, electricity is produced by different sources of energy, including, but not necessarily limited to, wind, solar, nuclear, and fossil fuels. The type and amount of emissions produced depend on how the electricity is generated. The sources used for electricity generation can be a function of region and available energy sources. Edge service providers 103/203 through, for example, an administrator device 205, can transmit details of the energy source or combination of energy sources used for respective ones of their edge devices 206 or groups of edge devices 206. In a non-limiting example, a mix of energy sources for a particular edge device 206 can be expressed in percentages (e.g., gas (49.3%), coal (0.5%), nuclear (29.8%), hydro (7.3%), wind (3.7%), biomass (7.5%), solar (1.5%), oil (0.2%), other fossil fuels (0.1%), other unknown fuel (0.1%)). The environmental impact component 125 uses given energy source percentages to compute emission rates for a particular edge device 206, group of edge devices 206 and/or an edge location. As noted above, emission rates may be expressed as pounds per MWh of CO2, SO2, and NOX.

The energy consumption data retrieved by the edge provider data retrieval component 122 from the edge service providers 103/203 also comprises edge device work performed for given time periods and edge device power consumption for the given time periods. Using this information, the energy efficiency component 124 is configured to compute a ratio of edge device work performed to edge device power consumption by one or more edge devices over one or more time periods. Alternatively, such computations can be performed at the edge devices 206 and stored at an edge location or in an external application or other location. In the case of ratios that have been calculated, the resulting ratios can be retrieved from their corresponding storage sources by the edge provider data retrieval component 122. The ratios are used by the energy efficiency component 124 to determine, for example, changes (e.g., increases, decreases) in energy efficiency levels of edge devices 206.

Metrics such as, for example, operations per second, input-output operations per second (IOPS), throughput, etc. measure the amount of edge device work. Power consumption can be measured in, for example, Watts, for a given time period. The resulting ratio of edge device work performed to edge device power consumption is used to determine the energy efficiency of an edge device 206. In some cases, the energy efficiency component 124 computes and averages multiple work: power consumption ratios of respective ones of a group of edge devices 206 to determine an average work: power consumption ratio for a group of edge devices 206 and/or of an edge service provider 103/203 with multiple edge devices 206. As used herein the term "average" is to be broadly construed to refer to, for example, mean, mode, median or other technique to find average. The energy efficiency component 124 is configured to tie work: power consumption ratios to particular workloads or types of workloads performed or to be performed by an edge device 206. For example, an application programming interface (API) can be used to provide data points to the energy efficiency component 124 regarding how much work is done versus how much work is expected based, for example, on historical performance of the edge device 206 in connection with the same or a similar workload.

Data pertaining to power consumption and corresponding energy efficiency for an edge device 206, as well as any associated sensors, can be logged by the metering and logging logic 207. The energy resource platform 110 (e.g., the energy efficiency component 124) monitors the data for inefficient energy use by the edge devices 206, which may comprise, for example, anomalies and/or fluctuations beyond a certain threshold or threshold ratio. The anomalies and/or fluctuations may be flagged and/or proactively reported to users and/or edge service providers 103/203 via the notification engine 150. In some embodiments, the comparison engine 160 is configured to determine the fluctuations and/or anomalies by comparing current usage data to historical usage of the edge devices 206, to data of other edge service providers 103, to the noted thresholds and/or to other acceptable metrics, which may be stored, for example, in the one or more databases 130. The embodiments may account for varying degrees of acceptable variation from what is considered to be normal operation and/or from predetermined acceptable values, and different actions may be taken at each degree. For example, if power consumption values are within a specified percentage of an acceptable value, range of values and/or threshold, the notification engine 150 may issue a warning to an edge service provider 103. The warning may include a request for confirmation whether any inefficiencies were expected or other explanation of the inefficiencies. If the power consumption values are beyond an acceptable range, the edge resource platform 110 may exclude a corresponding edge device(s) 206 from consideration for use by potential buyers until any issues are resolved. Alternatively, the edge resource platform 110 may assign additional monetary cost or other type of penalty to the corresponding edge service provider 103/203 until any issues are resolved.

In an effort to determine whether energy inefficiencies are due to problems on the edge service provider side or to code and/or workloads running on the edge devices 206, the proxy workload engine 170 is configured to generate one or more test workloads with known energy efficiency levels to be run on an edge device 206 or on multiple similar edge devices 206 to provide a basis for comparison. If the expected power usage for the test workload is higher on an edge device 206 in question than on other edge devices 206, then this may indicate an issue with the device and not the workload. Alternatively, if the test workload is higher than expected on multiple edge devices 206, then this may indicate an issue with the workload. Depending on the implementation, the notification engine 150 may issue notifications of the results of running the test workloads to an edge service provider 103/203 and/or a user (e.g., edge resource consumer). If the energy efficiency component 124 determines that an energy inefficiency is the responsibility of an edge service provider 103/203 (e.g., problem with an edge device 206), the edge resource platform 110 may exclude a corresponding edge device(s) 206 from consideration for use by potential buyers or assign additional monetary cost to the edge service provider 103/203 until any issues are resolved. For example, a penalty or a price increase for potential buyers may be added to the edge device(s) 206, thus acting as a deterrent for matching the edge resources with potential users of those resources. If the energy efficiency component 124 determines that an energy inefficiency is the responsibility of a buyer of edge resources due to, for example, problems with workload and/or code, the edge resource platform 110 may assign a higher price for the services or resources until any issues are resolved.

Figure 3:
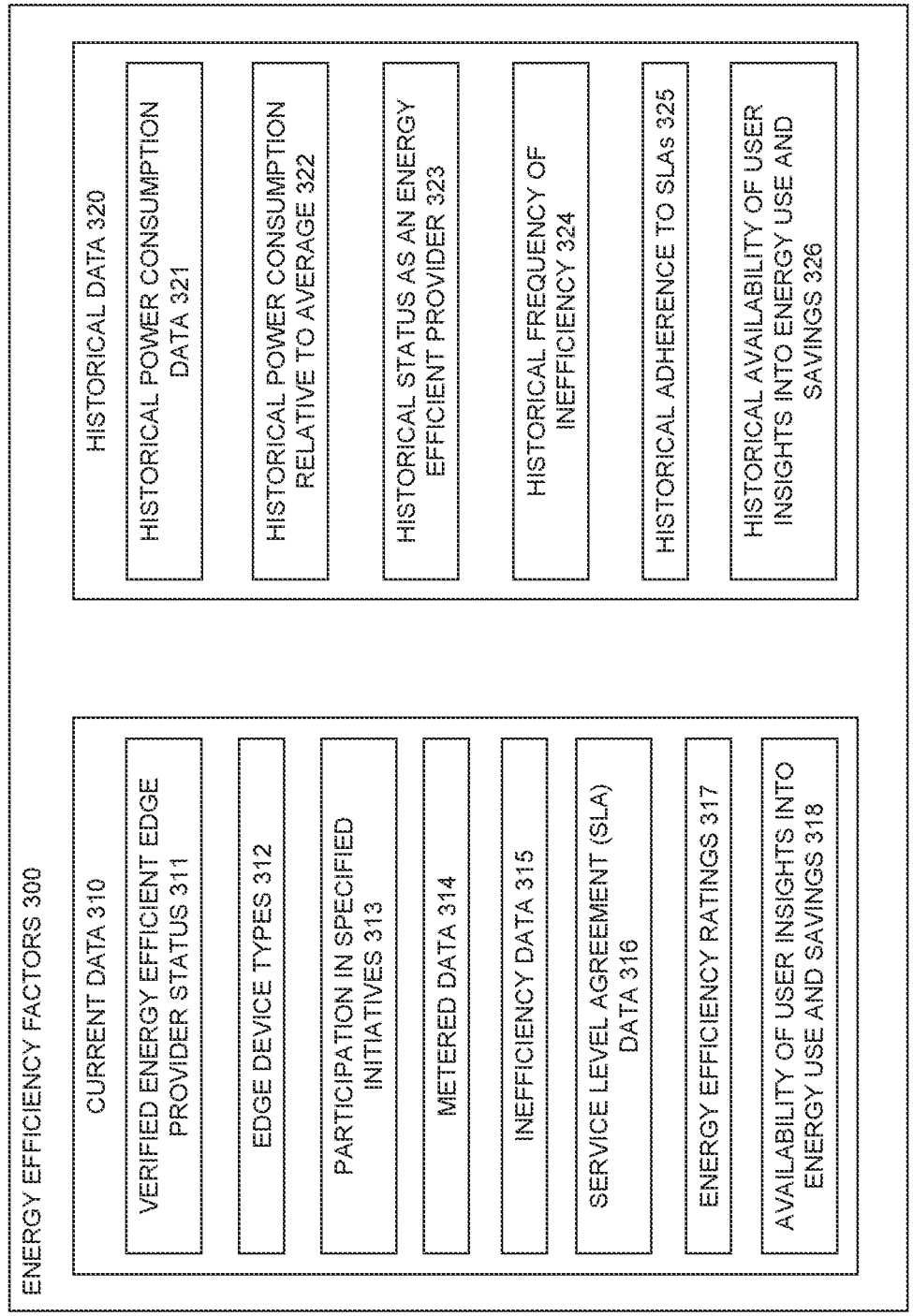
FIG. 3 illustrates example energy efficiency factors used in connection with matching edge service providers with edge service users in an illustrative embodiment.

In one or more illustrative embodiments, the energy consumption data comprises historical energy consumption data and/or current energy consumption data. FIG. 3 illustrates example energy efficiency factors 300 used in connection with matching edge service providers 103/203 with edge service consumers. Referring to FIG. 3, the energy efficiency factors 300 are categorized under current energy consumption data 310 and historical energy consumption data 320 of edge service providers 103/203. As explained in more detail herein, the current energy consumption data 310 comprises, for example, verified energy efficient edge provider status 311, edge device types 312, participation in specified initiatives 313, metered data 314, inefficiency data 315, service level agreement (SLA) data 316, energy efficiency ratings 317, and availability of user insights into energy use and savings 318. As explained in more detail herein, the historical energy consumption data 320 comprises, for example, historical power consumption data 321, historical power consumption relative to average 322, historical status as an energy efficient provider 323, historical frequency of inefficiency 324, historical adherence to SLAs 325, and historical availability of user insights into energy use and savings 326.

The historical energy consumption data 320 comprises, for example, historical power consumption data 321 and a comparison of historical power consumption to average power consumption over a given time period (historical power consumption relative to average 322) or to power consumption benchmarks. The current energy consumption data 310 is continuously updated and transmitted to the edge resource platform 110 within predetermined time intervals, and comprises, for example, metered data 314 collected by the metering and logging logic 207. The comparison engine 160 is configured to compare, for example, the historical and/or current power consumption of a given edge device 206 or group of edge devices 206 (e.g., average power consumption) offered by a first edge service provider 103/203 to historical and/or current power consumption of a given edge device 206 or group of edge devices 206 offered by a second edge service provider 103/203. Based on, for example, computations by the energy efficiency component 124 (e.g., work: power consumption ratio or a similar metric), the comparison of energy efficiency between edge service providers 103/203 and/or to pre-determined energy efficiency thresholds can be conducted by the comparison engine 160. The current and historical energy consumption data 310 and 320 may be workload specific.

The historical energy consumption data 320 further comprises, for example, details of the frequency of periods of energy inefficiency (historical frequency of inefficiency 324), and historical adherence to energy efficient SLAs (historical adherence to SLAs 325) by edge service providers 103/203 and their associated edge devices 206. Similarly, the current energy consumption data 310 comprises details of the current periods of energy inefficiency (inefficiency data 315) and current participation in specified energy efficiency initiatives 313 by edge service providers 103/203 and their associated edge devices 206. The current energy consumption data 310 further comprises current energy efficient SLAs in place, which correspond to the edge service providers 103/203 and their associated edge devices 206 (service level agreement (SLA) data 316). In one or more embodiments, current and/or historical energy consumption data 310 and/or 320 can be inputted to the machine learning component 123 which executes one or more machine learning models to predict changes in energy consumption and/or efficiency for edge service providers 103/203 and their associated edge devices 206. A matching component 127 uses the predictions, in combination with data about incoming workloads and edge device types 312 capable of processing the incoming workloads, to determine where to send incoming workloads such that increases in power consumption and other inefficiencies are prevented. In some cases, if an edge device 206 is approaching a threshold for power consumption that may lead to inefficient operations, workloads or portions of workloads may be reassigned by the matching component 127 to other edge device(s) 206. The matching component 127 is configured to check the other edge device(s) 206 for availability to process the workloads or portions of workloads, for any issues or problems with the edge device(s) 206, and whether the other edge device(s) 206 share power sources with the edge device 206 that is approaching a threshold for power consumption that may lead to inefficient operations. Identifying a sharing of power sources may cause the matching component 127 to find additional edge device(s) 206 which do not share power sources with the edge device 206 that is approaching inefficient operations to take on the workloads or portions of workloads.

Historical energy consumption data 320 may further comprise a historical status of an edge service provider 103/203 as an energy efficient provider (historical status as an energy efficient provider 323). Factors affecting status as an energy efficient provider include, for example, historical power sources used by the edge service provider 103/203 (e.g., percent of renewable energy sources), historical power cost (e.g., dollars/kwh), historical EnergyStar or other efficiency ratings, historical clean energy usage, past compliance with specific energy efficiency requirements and/or SLAs specifying energy efficiency terms (e.g., historical adherence to SLAs 325), historical load shedding capabilities and historical availability of user insights into energy use and savings 326. Similarly, a current verified energy efficient edge provider status 311 is based, at least in part, on current power sources used by the edge service provider 103/203 (e.g., percent of renewable energy sources), current power cost (e.g., dollars/kwh), current EnergyStar or other efficiency ratings (e.g., energy efficiency ratings 317), current clean energy usage, current compliance with specific energy efficiency requirements and/or SLAs specifying energy efficiency terms (e.g., participation in specified initiatives 313 and SLA data 316), load shedding capabilities and current availability of user insights into energy use and savings 318.

In some cases, a power provider portal can be accessed to capture environmental and cost information associated with edge device usage (e.g., via APIs, scraping websites, etc. to determine the cost and composition of power sources). The matching component 127 is configured to consider whether an edge service provider 103/203 has verified energy efficient edge provider status 311 when determining whether the edge service provider 103/203 should be an option (or higher ranked option) for taking on workloads of a requesting user.

In order to test the energy efficiency of an edge device 206 in connection with specific workloads, the proxy workload engine 170 generates one or more proxy workloads to test energy consumption of the edge device 206. The proxy workloads are developed to be the same as or similar to actual workloads that would be expected to run on the edge device 206. The generated proxy workloads are transmitted to the edge device 206 so that they may run on the edge device 206. In one or more embodiments, the work: power consumption ratio or another similar metric as a result of execution of the proxy workloads is computed to determine the energy efficiency associated with the proxy workloads.

According to illustrative embodiments, multiple proxy workloads are generated that can be leveraged by edge service providers 103/203 and/or users to validate the energy efficiency of an edge device 206 for given workloads. Some results of executing the proxy workloads determined by the proxy workload engine 170 comprise, for example, whether an edge device 206 has appropriate acceleration and uses hardware efficiently for a given workload. The proxy workload engine 170 also determines, for example, whether power use is proportional to workload, and whether execution of the workload can be performed within acceptable scheduling constraints. In some instances, policy configurations of an edge service provider 103/203 may result in a change of the time for workload completion that reduces power consumption or increases power consumption. Such policy configurations are taken into consideration when determining whether to include an edge service provider 103/203 as an option for receipt of workloads.

Figure 4:
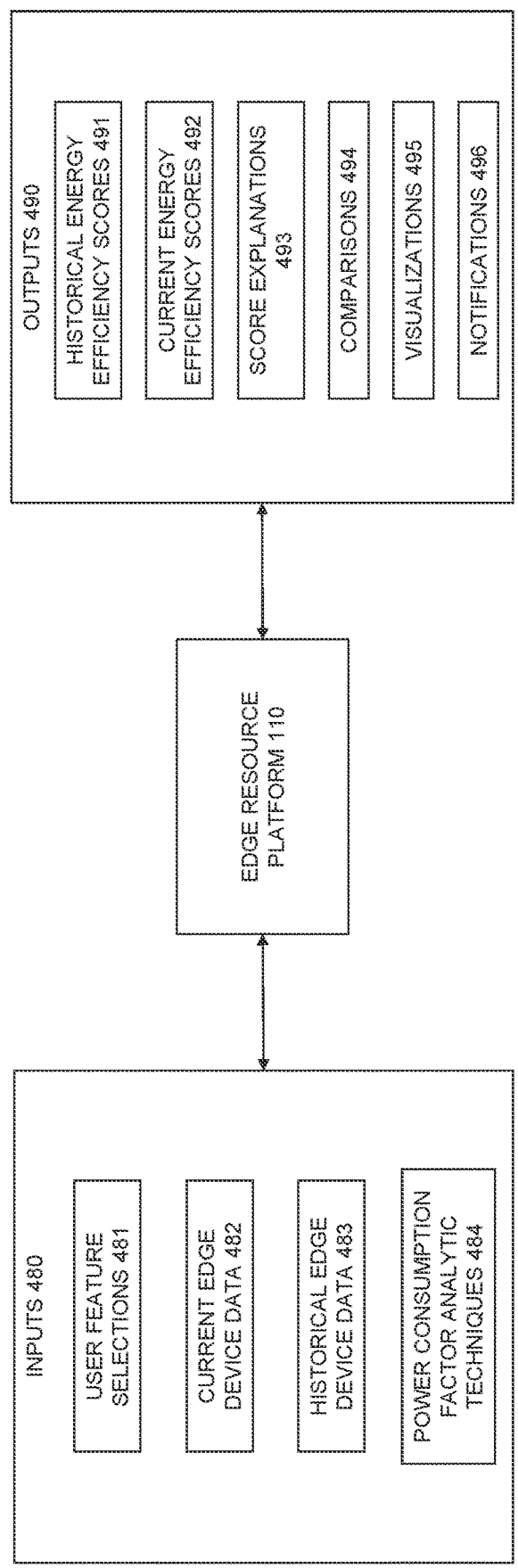
FIG. 4 is block diagram illustrating inputs to and outputs from an edge resource platform in an illustrative embodiment.

The block diagram 400 in FIG. 4 illustrates inputs 480 to and outputs 490 from an edge resource platform 110 in an illustrative embodiment. Based on one or more power consumption factor analytic techniques 484, the edge resource platform 110 analyzes user feature selections 481 for edge resources, current edge device data 482 and historical edge device data 483 to compute historical energy efficiency scores 491 and current energy efficiency scores 492. The edge resource platform generates explanation of the scores 493 and other visualizations 495 of the analysis.

In more detail, edge service provider data comprising current edge device data 482 and historical edge device data 483 pertaining to the current and historical energy consumption data 310 and 320 described herein is logged and stored in the one or more database(s) 130. As noted herein, the current edge device data 482 depends on the current status and compliance with energy efficiency requirements by the edge service providers 103/203, which are continuously updated within specified amounts of time. The edge provider data retrieval component 122 captures and stores the current edge device data 482. As noted herein, the historical edge device data 483 depends on historical factors surrounding past energy efficiency of the edge devices 206. An example of the historical edge device data 483 includes a comparison of historical power consumption to average power consumption over a given time period. In this case, for any given transaction to which an edge service provider 103/203 (e.g., seller) has been a party, the difference between the edge service provider's level of energy consumption and the average price at a particular point in time can be calculated.

The interface and visualization engine 140 generates one or more visualizations 495 illustrating differences between an edge service provider's energy consumption levels and average prices at particular points in time. The visualizations 495 may be displayed, for example, on a user interface of one of the user devices 102 and/or of an administrator device 205, and depict percentage differences with different display options (e.g., colored text, graphs, etc.). In some cases, a score that compares a given edge service provider's historical power consumption to an average power consumption of multiple edge service providers 103/203 could be included with a given visualization 495. The comparison of the given edge service provider's historical power consumption to the average power consumption can be generated by calculating in which percentile over or under the average power consumption the given edge service provider appears. In one or more illustrative embodiments, the differences between an edge service provider's energy consumption levels and average prices at particular points in time and/or the comparison of the edge service provider's historical power consumption to an average power consumption of multiple edge service providers 103/203 is inputted to one or more machine learning models of the machine learning component 123 to automatically predict the edge service provider's power consumption. Other calculations and processes can be used to evaluate edge service providers 103/203 and edge devices 206 based on other variables as described hereinabove.

The computation method for historical and current energy efficiency scores 491 and 492 for operation of edge devices 206 associated with respective ones of edge service providers 103/203 may vary based on the implementation and goals. In some embodiments, the computation is based, at least in part, on an edge device's energy capacity and/or average power consumption per number of threads. In some cases, for example, when measuring actual current energy usage, an equation may be used to compute the current energy efficiency score 492. In another scenario, the historical edge device data 483 is captured and input into a machine learning model (e.g., a neural network or federated learning model) of the machine learning component 123 to determine a projected energy efficiency score. Actual measurements or other calculations can be fed back to the machine learning model to continuously train the machine learning model to improve the projections. Another example of how to improve the projections includes evaluating whether the edge service provider 103/203 has continued to uphold its current standards (within a certain threshold) after a transaction. If the edge service provider 103/203 has failed to uphold its current standards, projected energy efficiency scores may be reduced by the machine learning model in future iterations.

According to one or more embodiments, the ranking module 126 ranks a plurality of edge service providers 103/203 based on their energy efficiency scores. The ranking is used in a matching algorithm by the matching component 127 to match the one or more user feature selections 481 (e.g., energy consumption requirements) with one or more edge devices 206 corresponding to the user feature selections 481. A user (e.g., buyer of edge device resources) via a user interface on a user device 102, can select energy efficiency and/or environmental impact as a matching criteria for matching the user feature selections 481 with an edge device 206, a group of edge devices 206 and/or an edge service provider 103/203. For example, within the energy efficiency category, users can select current and/or historical energy efficiency factors, such as those described hereinabove. The matching component 127 is configured to match one or more edge devices with one or more of the historical and/or current energy efficiency scores 491 and 492. In illustrative embodiments, energy efficiency, power consumption and/or environmental impact are factored into the edge resource matching results, which may be displayed on the visualizations 495 generated by the interface and visualization engine 140. For example, in some embodiments, a user may be able to view a user interface on one of the user devices 102 that explains the energy efficiency and/or environmental impact scores (score explanations 493). The score explanations 493 and visualizations 495 include the inputs that were used to compute the scores, and/or the analytics used to calculate the scores. Graphical visualizations (e.g., ratings for each input and/or graphs showing comparisons over time, and with other inputs) may also be used.

In accordance with one or more embodiments, the notification engine 150 issues notifications 496 to the edge service providers 103/203 or users with energy efficiency and/or environmental impact scores corresponding to their edge devices 206 and/or workloads, along with recommendations on how to increase energy efficiency or decrease environmental impact. For buyers (e.g., consumers of edge device resources), the recommendations may include suggestions such as, for example, to update policies and/or for the types of edge devices to use. Notifications 496 to buyers may further comprise information on the amount of power being consumed, which could be estimated based on the consumer's percentage of resource utilization on a device, and/or calculated precisely in the case of per-solution edge service provider power consumption metering. Similarly, edge service providers 103/203 may be provided with information pertaining to power consumption savings (e.g., compared to their prior usage in a given timeframe or since making a change) and/or other issues pertaining to their resources as described herein, along with recommendations for corrections. Depending on pre-configured settings, the recommendations can automatically be implemented.

According to one or more embodiments, the comparison engine 160 generates comparisons 494 between edge service providers 103/203 with similar workloads. For example, logs of including power consumption and workload type are used by the comparison engine 160 to compare the edge service providers 103/203. If necessary, a test workload generated by the proxy workload engine 170 is executed on a more energy efficient edge device as a control, such as, for example, a device known to have high energy efficiency or meeting a certain energy efficiency standard.

The data collection and analysis engine 120, database(s) 130, interface and visualization engine 140, notification engine 150, comparison engine 160, the proxy workload engine 170 and the components thereof in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, as described herein, processing devices in some embodiments are implemented at least in part utilizing virtual resources such as VMs or containers (e.g., Linux containers (LXCs)), or combinations of both as in an arrangement in which Docker containers or other types of LXCs are configured to run on VMs.

The data collection and analysis engine 120, database(s) 130, interface and visualization engine 140, notification engine 150, comparison engine 160 and the proxy workload engine 170 (or one or more components thereof) may be implemented on respective distinct processing platforms, although numerous other arrangements are possible. For example, in some embodiments at least portions of one or more of the data collection and analysis engine 120, database(s) 130, interface and visualization engine 140, notification engine 150, comparison engine 160 and the proxy workload engine 170 are implemented on the same processing platform.

Additionally, at least portions of the data collection and analysis engine 120, database(s) 130, interface and visualization engine 140, notification engine 150, comparison engine 160 and the proxy workload engine 170 in some embodiments may be implemented as part of a cloud-based system. The data collection and analysis engine 120, database(s) 130, interface and visualization engine 140, notification engine 150, comparison engine 160 and the proxy workload engine 170 can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between elements of the information processing system 100 may take place over one or more networks including network 104.

The term "processing platform" as used herein is intended to be broadly construed so as to encompass, by way of illustration and without limitation, multiple sets of processing devices and one or more associated storage systems that are configured to communicate over one or more networks. For example, distributed implementations of the edge resource platform 110 are possible, in which certain ones of the data collection and analysis engine 120, database(s) 130, interface and visualization engine 140, notification engine 150, comparison engine 160 and the proxy workload engine 170, for example, reside in one edge location in a first geographic location while other ones of the data collection and analysis engine 120, database(s) 130, interface and visualization engine 140, notification engine 150, comparison engine 160 and the proxy workload engine 170 reside in at least a second edge location in at least a second geographic location that is potentially remote from the first geographic location. Thus, it is possible in some implementations for one or more of the data collection and analysis engine 120, database(s) 130, interface and visualization engine 140, notification engine 150, comparison engine 160 and the proxy workload engine 170 in the edge resource platform 110 to reside in different geographic locations. Numerous other distributed implementations of the components of the edge resource platform 110 are possible.

Additional examples of processing platforms utilized to implement portions of the system 100 in illustrative embodiments will be described in more detail below in conjunction with FIGS. 6 and 7.

It is to be understood that the particular set of elements shown in FIG. 1 for managing energy efficiency settings and requirements for edge resource transactions are presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for managing energy efficiency settings and requirements for edge resource transactions will now be described in more detail with reference to the flow diagram of FIG. 5. It is to be understood that this particular process is only an example, and that additional or alternative processes for managing energy efficiency settings and requirements for edge resource transactions can be carried out in other embodiments.

The process 500 as shown includes steps 502 through 510, and is suitable for use in the system 100 but is more generally applicable to other types of systems for managing energy efficiency settings and requirements (i.e., parameters) for edge resource transactions. Other arrangements of the edge resource platform 110 and/or other system components can be configured to perform at least portions of one or more of the steps in other embodiments.

In step 502, energy consumption data corresponding to operation of a plurality of edge devices is received from a plurality of edge service providers. The energy consumption data comprises metered data from respective ones of the plurality of edge devices collected on at least one of a per application and a per edge device basis. The energy consumption data further comprises metadata for a plurality of software threads being executed on the plurality of edge devices and corresponding power consumption data for respective ones of the plurality of software threads.

In step 504, a plurality of energy efficiency scores are computed based, at least in part, on the energy consumption data, wherein the plurality of energy efficiency scores correspond to operation of one or more edge devices of the plurality of edge devices associated with respective ones of the plurality of edge service providers. The plurality of energy efficiency scores are based, at least in part, on at least one of energy capacity of the one or more edge devices and power consumption for a plurality of software threads being executed on the one or more edge devices. In one or more embodiments, computing the plurality of energy efficiency scores comprises inputting the energy consumption data to one or more machine learning models, wherein the one or more machine learning models predict the plurality of energy efficiency scores.

In step 506, one or more energy consumption requirements are received from at least one user device for the operation of the one or more edge devices. In step 508, based, at least in part, on the plurality of energy efficiency scores, a subset of the plurality of edge devices corresponding to the one or more energy consumption requirements is identified. The identifying comprises inputting the plurality of energy efficiency scores to a matching algorithm that matches the one or more energy consumption requirements with one or more of the plurality of energy efficiency scores. In step 510, data corresponding to the subset of the plurality of edge devices is transmitted to the at least one user device.

The energy consumption data may further comprise data corresponding to a composition of electricity consumed by the one or more edge devices and/or a ratio of edge device work performed to edge device power consumption by the one or more edge devices. In one or more embodiments, the energy consumption data comprises at least one of historical energy consumption data and current energy consumption data, wherein the historical energy consumption data comprises a comparison of historical power consumption to average power consumption over a given time period, and wherein the current energy consumption data is continuously updated within a predetermined time interval.

According to at least one embodiment, the one or more energy consumption requirements comprise one or more environmental impact settings. A plurality of environmental impact ratings corresponding to the operation of the one or more edge devices associated with the respective ones of the plurality of edge service providers are computed. The plurality of environmental impact ratings are based, at least in part, on electricity usage of the one or more edge devices measured in pounds per MWh of $CO_2$, $SO_2$ and $NO_X$. The identification of the subset of the plurality of edge devices corresponding to the energy consumption requirements is based, at least in part, on the plurality of environmental impact ratings.

In one or more embodiments, a visualization of the computation of the plurality of energy efficiency scores is generated and transmitted to the at least one user device. One or more proxy workloads can be generated to test energy consumption of at least one of the plurality of edge devices, and transmitted to the at least one of the plurality of edge devices.

Figure 5:
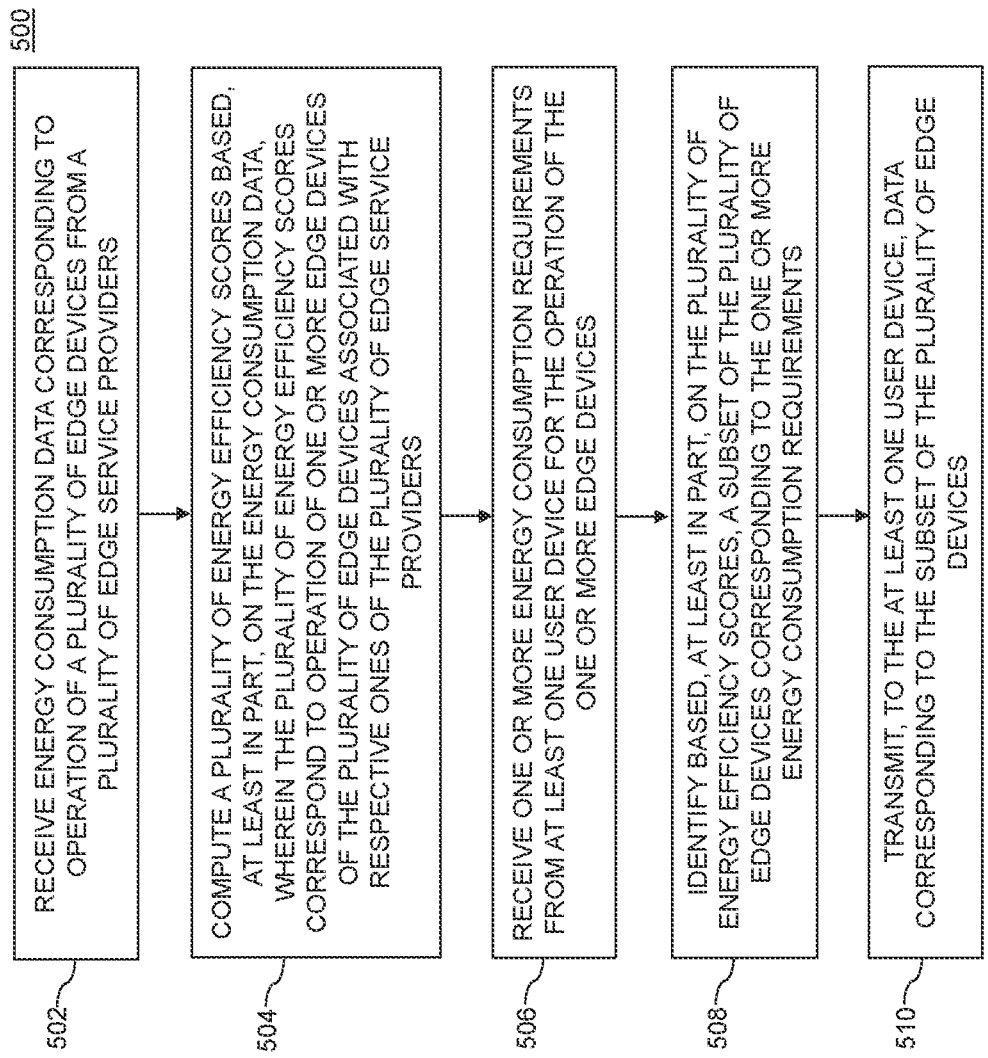
FIG. 5 is a flow diagram of an exemplary process managing energy efficiency settings and requirements for edge resources in an illustrative embodiment.

It is to be appreciated that the FIG. 5 process and other features and functionality described above can be adapted for use with other types of information systems configured to manage energy efficiency settings and requirements for edge resource transactions.

The particular processing operations and other system functionality described in conjunction with the flow diagram of FIG. 5 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 5 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments provide technical solutions that incorporate edge service provider energy efficiency and environmental impact settings into transactions for edge device resources and services. Advantageously, the embodiments provide a platform for defining and configuring energy efficiency and environmental impact settings and requirements for edge devices in an automated edge utility marketplace.

There are technical problems with conventional approaches in that potential consumers of edge device resources lack visibility into the power consumption and/or energy efficiency practices of potential edge service providers and their supply chain, and lack the ability to assess the environmental impact of the power being consumed by edge devices of an edge service provider.

The technical solutions provided herein provide for the automatic generation of energy efficiency and environmental impact scores for edge service providers and their associated edge devices based on a variety of factors. The factors include, but are not necessarily limited to, current and historical power consumption data, current and historical instances of energy inefficiencies and status as an energy efficient edge service provider.

The embodiments further provide for metering and logging of energy consumption by edge devices on a per application and/or per device basis. The metering is based on software threads running on the edge devices, and may be used as a basis for determining energy efficiency and environmental impact scores, as well as for determining billing rates in an edge utility setting.

As an additional advantage, the technical solutions of the embodiments provide mechanisms to enabling feedback to assist edge service providers with improving energy efficiency and environmental impact in connection with the delivery of edge device resources.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a VM or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise a cloud infrastructure including VMs and/or container sets implemented using a virtualization infrastructure that runs on a physical infrastructure. The cloud infrastructure further comprises sets of applications running on respective ones of the VMs and/or container sets. These and other types of cloud infrastructure can be used to provide what is also referred to herein as a multi-tenant environment. As mentioned previously, cloud infrastructure as disclosed herein can include cloud-based systems. VMs provided in such systems can be used to implement at least portions of one or more of a computer system and a cloud service provider in illustrative embodiments.

Illustrative embodiments of processing platforms utilized to implement functionality for managing energy efficiency settings and requirements for edge resource transactions will now be described in greater detail with reference to FIGS. 6 and 7. Although described in the context of system 100, these platforms may also be used to implement at least portions of other information processing systems in other embodiments.

Figure 6:
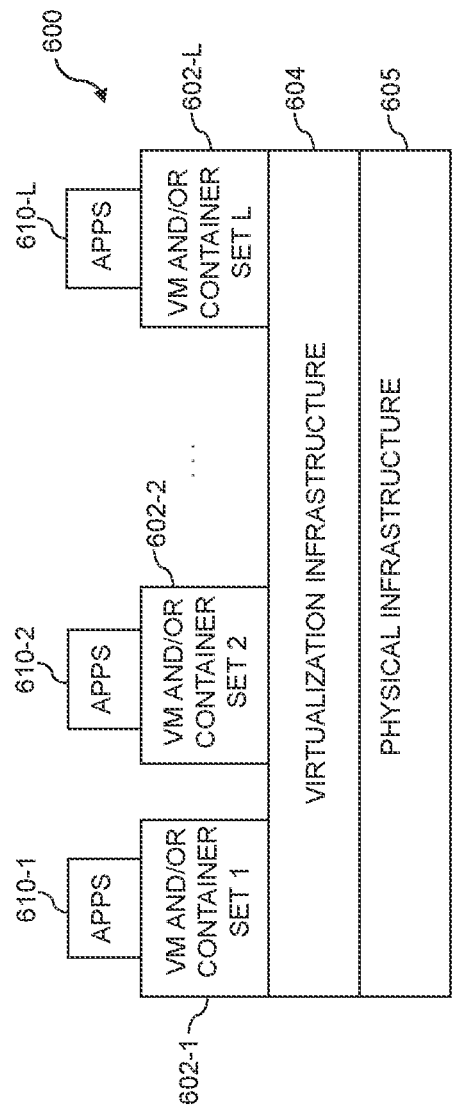
FIGS. 6 and 7 show examples of processing platforms that may be utilized to implement at least a portion of an information processing system in illustrative embodiments.
Figure 7:
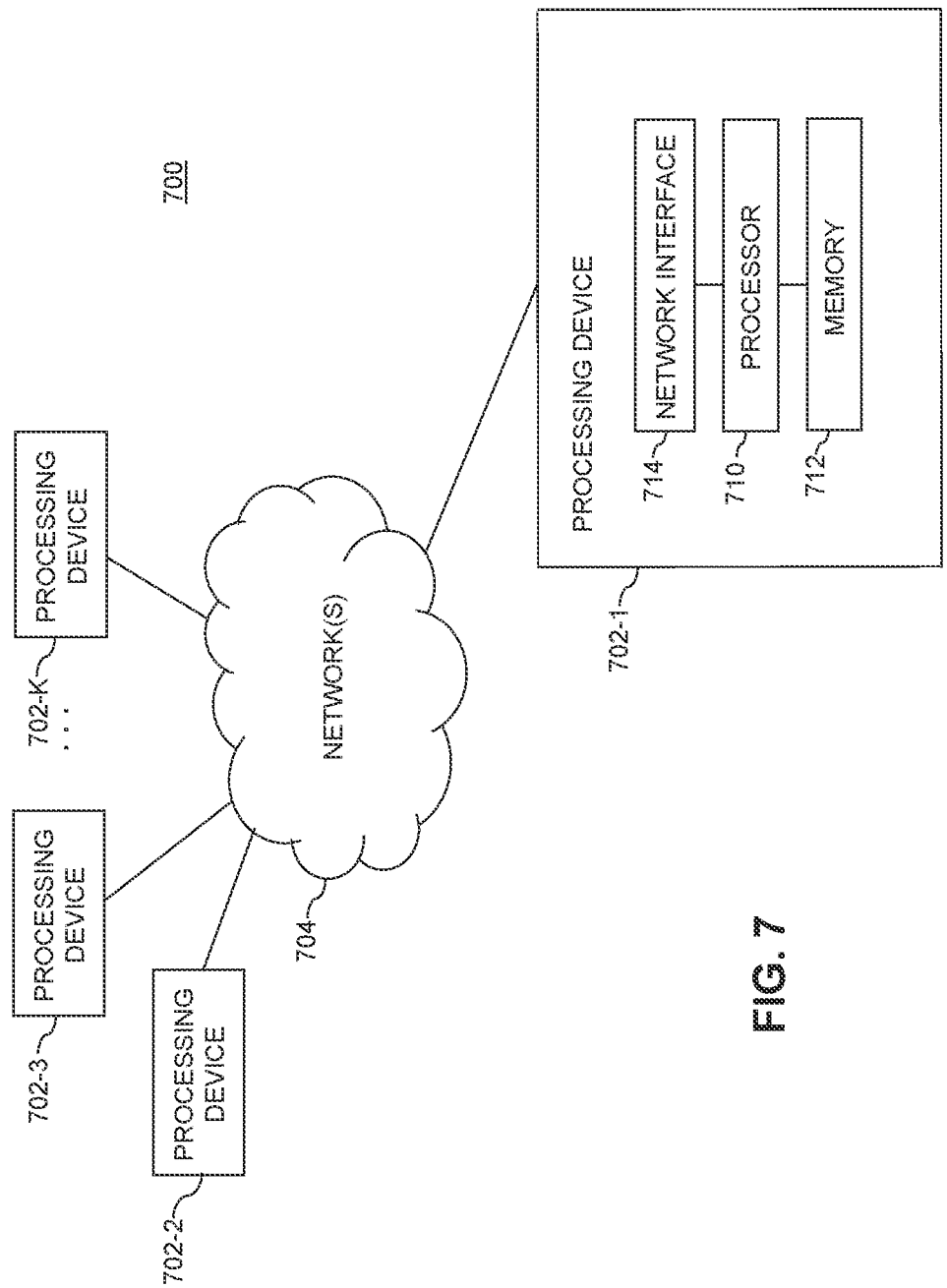

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), an FPGA, a CPU, a GPU, a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing as disclosed herein can be implemented at least in part in the form of one or more software programs stored in memory and executed by a processor of a processing device. For example, at least portions of the functionality for managing energy efficiency settings and requirements for edge resource transactions as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, edge resource platforms, edge service providers, edge devices, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
  receiving energy consumption data corresponding to operation of a plurality of edge devices from a plurality of edge service providers;

computing, using one or more machine learning models, a plurality of energy efficiency scores based, at least in part, on the energy consumption data;

computing a plurality of environmental impact ratings based, at least in part, on electricity usage of one or more edge devices of the plurality of edge devices measured in pounds per megawatt hour of carbon dioxide, sulfur dioxide and nitrogen oxide over a time instance, wherein the plurality of energy efficiency scores and the plurality of environmental impact ratings each correspond to operation of the one or more edge devices of the plurality of edge devices associated with respective ones of the plurality of edge service providers;

receiving one or more energy consumption parameters and one or more environmental impact parameters from at least one user device for the operation of the one or more edge devices;

identifying based, at least in part, on the plurality of energy efficiency scores and the plurality of environmental impact ratings, a subset of the plurality of edge devices corresponding to at least one of the one or more energy consumption parameters and the one or more environmental impact parameters;

transmitting, to the at least one user device, data corresponding to the subset of the plurality of edge devices; and adjusting an assigned rate of the subset of the plurality of edge devices based on the transmitted data corresponding to the subset of the plurality of edge devices;

wherein the method is performed by at least one processing device comprising a processor coupled to a memory.

2. The method of claim 1, wherein the energy consumption data comprises metered data from respective ones of the plurality of edge devices collected on at least one of a per application and a per edge device basis.

3. The method of claim 2, wherein the energy consumption data further comprises metadata for a plurality of software threads being executed on the plurality of edge devices and corresponding power consumption data for respective ones of the plurality of software threads.

4. The method of claim 1, wherein the energy consumption data comprises data corresponding to a composition of electricity consumed by the one or more edge devices.

5. The method of claim 1, wherein the energy consumption data comprises a ratio of edge device work performed to edge device power consumption by the one or more edge devices.

6. The method of claim 1, wherein the energy consumption data comprises at least one of historical energy consumption data and current energy consumption data, wherein the historical energy consumption data comprises a comparison of historical power consumption to average power consumption over a given time period, and wherein the current energy consumption data is continuously updated within a predetermined time interval.

7. The method of claim 1, wherein computing the plurality of energy efficiency scores comprises inputting the energy consumption data to one or more machine learning models, wherein the one or more machine learning models predict the plurality of energy efficiency scores.

8. The method of claim 1, wherein the plurality of energy efficiency scores are based, at least in part, on at least one of energy capacity of the one or more edge devices and power consumption for a plurality of software threads being executed on the one or more edge devices.

9. The method of claim 1, wherein the identifying of the subset of the plurality of edge devices corresponding to the energy consumption parameters comprises inputting the plurality of energy efficiency scores to a matching algorithm that matches the one or more energy consumption parameters with one or more of the plurality of energy efficiency scores.

10. The method of claim 1, wherein the one or more energy consumption parameters comprise one or more environmental impact settings.

11. The method of claim 1, further comprising:
generating a visualization of the computation of the plurality of energy efficiency scores; and
transmitting the visualization to the at least one user device.

12. The method of claim 1, further comprising:
generating one or more proxy workloads to test energy consumption of at least one of the plurality of edge devices; and
transmitting the one or more proxy workloads to the at least one of the plurality of edge devices.

13. An apparatus, comprising:
at least one processor and at least one memory storing computer program instructions wherein, when the at least one processor executes the computer program instructions, the apparatus is configured:
to receive energy consumption data corresponding to operation of a plurality of edge devices from a plurality of edge service providers;
to compute, using one or more machine learning models, a plurality of energy efficiency scores based, at least in part, on the energy consumption data;
to compute a plurality of environmental impact ratings based, at least in part, on electricity usage of one or more edge devices of the plurality of edge devices measured in pounds per megawatt hour of carbon dioxide, sulfur dioxide and nitrogen oxide over a time instance, wherein the plurality of energy efficiency scores and the plurality of environmental impact ratings each correspond to operation of the one or more edge devices of the plurality of edge devices associated with respective ones of the plurality of edge service providers;
to receive one or more energy consumption parameters and one or more environmental impact parameters from at least one user device for the operation of the one or more edge devices;
to identify based, at least in part, on the plurality of energy efficiency scores and the plurality of environmental impact ratings, a subset of the plurality of edge devices corresponding to at least one of the one or more energy consumption parameters and the one or more environmental impact parameters;
to transmit, to the at least one user device, data corresponding to the subset of the plurality of edge devices; and
to adjust an assigned rate of the subset of the plurality of edge devices based on the transmitted data corresponding to the subset of the plurality of edge devices.

14. The apparatus of claim 13, wherein the energy consumption data comprises metered data from respective ones of the plurality of edge devices collected on at least one of a per application and a per edge device basis.

15. The apparatus of claim 14, wherein the energy consumption data further comprises metadata for a plurality of software threads being executed on the plurality of edge devices and corresponding power consumption data for respective ones of the plurality of software threads.

16. The apparatus of claim 13, wherein the energy consumption data comprises data corresponding to a composition of electricity consumed by the one or more edge devices.

17. The apparatus of claim 13, wherein the at least one processor executes the computer program instructions, the apparatus is further configured:
to generate a visualization of the computation of the plurality of energy efficiency scores; and
to transmit the visualization to the at least one user device.

18. A non-transitory computer-readable storage medium comprising machine executable code stored on the non-transitory computer-readable storage medium, the machine executable code instructs a processor:
to receive energy consumption data corresponding to operation of a plurality of edge devices from a plurality of edge service providers;
to compute, using one or more machine learning models, a plurality of energy efficiency scores based, at least in part, on the energy consumption data;
to compute a plurality of environmental impact ratings based, at least in part, on electricity usage of one or more edge devices of the plurality of edge devices measured in pounds per megawatt hour of carbon dioxide, sulfur dioxide and nitrogen oxide over a time instance, wherein the plurality of energy efficiency scores and the plurality of environmental impact ratings each correspond to operation of the one or more edge devices of the plurality of edge devices associated with respective ones of the plurality of edge service providers;
to receive one or more energy consumption parameters and one or more environmental impact parameters from at least one user device for the operation of the one or more edge devices;
to identify based, at least in part, on the plurality of energy efficiency scores and the plurality of environmental impact ratings, a subset of the plurality of edge devices corresponding to at least one of the one or more energy consumption parameters and the one or more environmental impact parameters;
to transmit, to the at least one user device, data corresponding to the subset of the plurality of edge devices; and
to adjust an assigned rate of the subset of the plurality of edge devices based on the transmitted data corresponding to the subset of the plurality of edge devices.

19. The non-transitory computer-readable storage medium of claim 18, wherein the energy consumption data comprises metered data from respective ones of the plurality of edge devices collected on at least one of a per application and a per edge device basis.

20. The non-transitory computer-readable storage medium of claim 19, wherein the energy consumption data further comprises metadata for a plurality of software threads being executed on the plurality of edge devices and corresponding power consumption data for respective ones of the plurality of software threads.

* * * * *